United States Patent
Svantesson et al.

[11] Patent Number: 6,138,968
[45] Date of Patent: Oct. 31, 2000

[54] ARRANGEMENT FOR RELEASEABLE ATTACHMENT OF A UNIT TO AN ATTACHMENT SURFACE

[75] Inventors: Mikael Svantesson, Västra Frölunda; Dan Pettersson, Torslanda; Peter Björk, Västra Frölunda; Anders Johansson, Rönnäng, all of Sweden

[73] Assignee: Telefonaktiebolaget LM Ericsson, Stockholm, Sweden

[21] Appl. No.: 09/013,060

[22] Filed: Jan. 26, 1998

[30] Foreign Application Priority Data

Jan. 27, 1997 [SE] Sweden .................................. 9700254

[51] Int. Cl.⁷ .................................................. A47B 96/06
[52] U.S. Cl. .................................. 248/222.13; 248/316.2; 248/220.22
[58] Field of Search ............................. 248/316.8, 316.3, 248/316.4, 496, 245, 310, 220.21, 225.21, 222.11, 222.12, 222.13, 316.2; 312/245; 211/94.01; 439/327, 716, 347

[56] References Cited

U.S. PATENT DOCUMENTS

| | | | |
|---|---|---|---|
| 448,359 | 3/1891 | Nichols | 248/220.22 |
| 1,884,370 | 10/1932 | Swanson | 248/310 |
| 1,898,835 | 2/1933 | Henderson | 248/311.2 |
| 3,188,028 | 6/1965 | Waller | 248/316.8 |
| 4,454,385 | 6/1984 | Borne et al. | 174/158 R |
| 4,826,115 | 5/1989 | Novitski | 248/225.2 |
| 5,135,415 | 8/1992 | Huber | 439/716 |
| 5,248,264 | 9/1993 | Long et al. | 439/347 |

*Primary Examiner*—Ramon O. Ramirez
*Assistant Examiner*—Gwendolyn Baxter
*Attorney, Agent, or Firm*—Burns, Doane, Swecker & Mathis, L.L.P.

[57] ABSTRACT

An arrangement for releaseably attaching a unit to an attachment surface includes a first pair of cooperative engagement members and a second pair of cooperative engagement members. In each pair of cooperative engagement members, one member is fastened to the attachment surface, and the other member is attached to the unit. In each pair of engagement members, one engagement member is formed by a wedge member, and at least one engagement member in one of the pairs is movably attached in relation to its cooperative engagement member. On assembly and disassembly, respectively, the moveable engagement member can be displaced from the cooperative engagement member. In the engagement position, the movable engagement member is fastened against its cooperative engagement member by a tightening device, as a support surface of the unit is in close contact with a support surface on the attachment surface.

10 Claims, 7 Drawing Sheets

ARRANGEMENT FOR RELEASEABLE ATTACHMENT OF A UNIT TO AN ATTACHMENT SURFACE

TECHNICAL FIELD

The present invention relates to an arrangement for releasable attachment of a unit to an attachment surface. The arrangement is provided with a number of pairs of engagement members which are intended to engage with each other in order to secure the attachment. In each pair of engagement members, one member is intended to be fastened to the attachment surface. The other engagement member is attached to the unit.

BACKGROUND OF THE INVENTION

From the U.S. Pat. No. 4,454,382 there is known an arrangement for releasable attachment by means of engagement members. Said engagement members include hook-like members which are intended to engage with flanges arranged on attachment rails. With this known solution, one and the same attachment arrangement can be used for different types of attachment rails. The attachment is effected by means of mould engagement, which is secured by means of a pressure spring. In this connection, considerable spring force is required for attachment of heavier units, through which an attachment with limited reliability is obtained, unless extremely substantial spring forces are applied. In for example, an environment which is exposed to vibrations, there is a risk of the unit, in some disadvantageous situations, vibrating until it comes loose.

SUMMARY OF THE INVENTION

The object of the present invention is to provide an arrangement which ensures a secure attachment which utilizes relatively small external tensional forces on the engagement members forming part of the arrangement. Furthermore, a mounting is provided which can withstand considerable stress, such as vibrations and impacts/shakings.

Said object is achieved by means of an arrangement which includes pairs of engagement members according to the present invention, which is characterized in that at least one of the engagement members in each pair is constituted by a wedge member and that at least one of the engagement members in one of the pairs is movably attached in relation to the corresponding engagement member in the other pair of engagement members. When the unit is in mounting position, the movable engagement member is displaced from the other engagement member in the same pair of members. When the unit is in attachment position, the movable engagement member is tightened against the other engagement member by means of a tightening device, while at least one support surface of the unit is in close contact with at least one support surface of the attachment surface.

By using wedge members according to the invention, a required engagement is provided between the engagement members, said engagement being obtained by means of frictional engagement and standard forces, which, in conjunction with a wedge effect, provide considerable engagement forces at even relatively small tensional forces, whereupon relatively heavy units can be attached to a surface.

BRIEF DESCRIPTION OF THE DRAWINGS

The invention will be further described in the following with an embodiment and with reference to the annexed drawings, in which.

DETAILED DESCRIPTION

Figure 1:
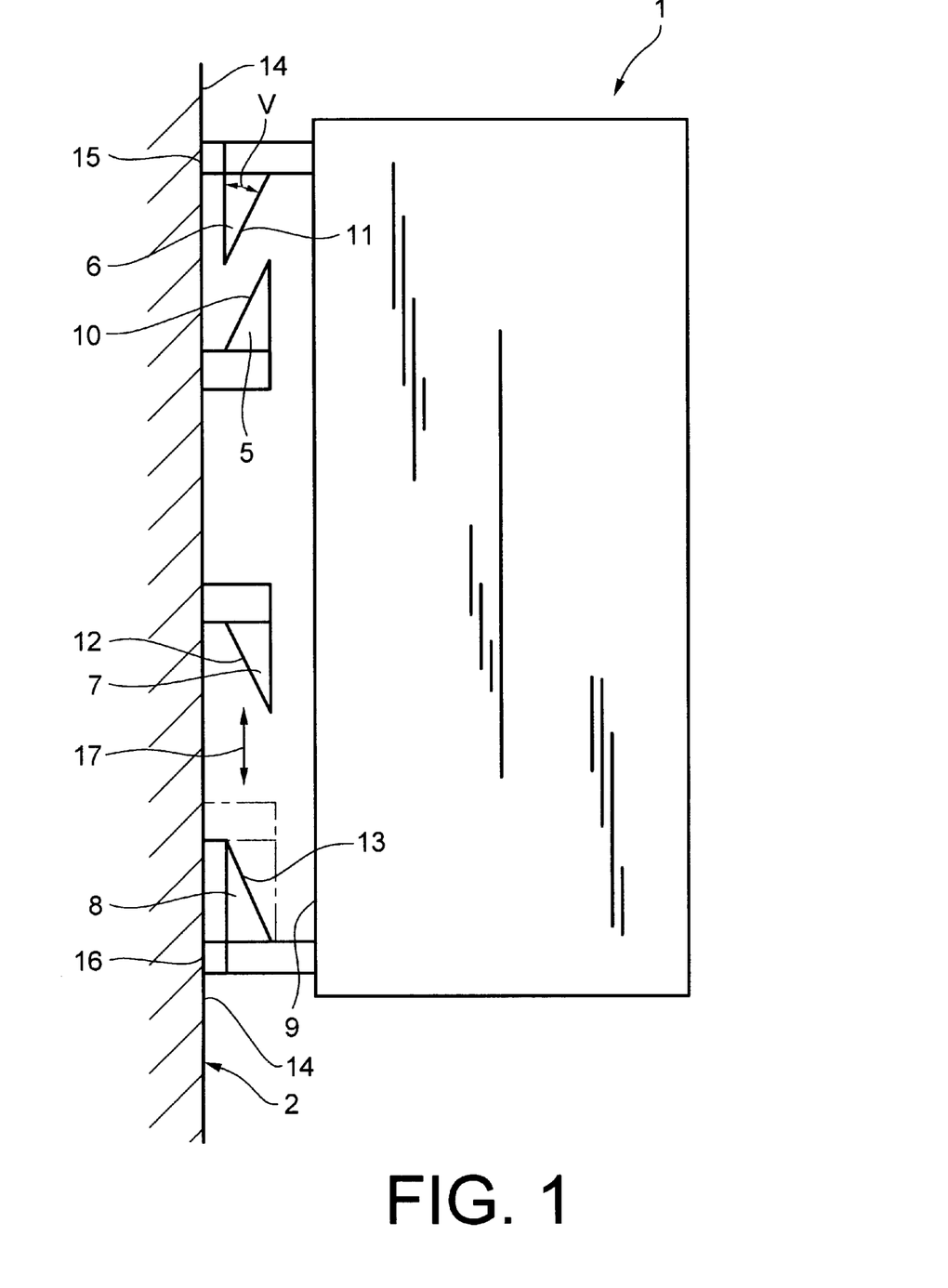
FIG. 1 illustrates the principle of the invention.

Thus, FIG. 1 shows the basic principle of the attachment arrangement according to the invention, said attachment arrangement being intended for attachment of a releaseable unit, for example an electronic unit such as a base station for telecommunication, for example, mobile telephone traffic. The unit 1 is intended to be attached to an attachment surface 2, which for example can be a wall, a pole, a horizontal balk or the like. The attachment arrangement includes at least two pairs of engagement members 5, 6, 7, 8 which, by means of mutual engagement between the engagement members in each pair, ensure that the unit is attached to the attachment surface 2. According to the invention, at least one engagement member in each pair of members is constituted by a wedge member, and an optimal attachment is achieved in those cases where both engagement members 5, 6, 7, 8 in each pair are constituted by wedge members, as is further shown in the explanatory sketch according to FIG. 1. Thus, the engagement members are hereinafter termed wedge members, of which one of the wedge members 5, 7 in each pair of members is fastened to the attachment surface either directly or through some form of base structure, which will be described in detail below. The other wedge member 6, 8 in each pair is attached to the releaseable unit 1, preferably to a rear side 9.

The wedge members 5–8 each disclose a wedge surface 10, 11, 12, 13 which is located at an acute angle in relation to the attachment surface 2. The wedge angle v is selected so that considerable frictional drag is obtained, while at the same time the force which presses the wedge members together in pairs can remain moderate. The wedge angle v is preferably the same for all the wedge members and is, for example, in the range of 25–45°, in the shown example 35°, and is preferably of such size that self-locking does not occur. Furthermore, the points of the wedge members 5, 7 which are fastened to the attachment surface are directed away from each other, while the points of the wedge members 6, 8 are directed towards each other. AN additional condition is that the wedge surfaces 10, 12 of the wedge members 5, 7 which are part of the attachment surface 2 are turned towards the attachment surface, and that the wedge surfaces 11, 13 of the wedge members 6, 8, which are part of the unit 1, are turned towards the unit.

In order to achieve a wedge effect between the wedge members in each pair of wedge members, support surfaces are required for each pair of wedge members; a first support surface 14 which is schematically illustrated in FIG. 1 by the attachment surface 2 or is constituted by a separate surface which extends in parallel with the attachment surface, and also a support surface 15, 16 which in attachment position is in close contact with the first support surface and is supported by the removable unit 1.

According to the invention, at least one of the wedge members 7 in the schematically shown example is one of the wedge members which are attached to the attachment surface 2, said wedge member being movably attached in order to be readjustable in the direction of the arrow 17. By means of the movability of the wedge member 7, the wedge member is readjustable between a mounting position, in which the wedge member is displaced and which is shown in FIG. 1 with an unbroken line, and an attachment position, which is shown with a dotted line.

The principle of the mounting of the unit 1 to the attachment surface 2 is that the wedge member 7, which thus is in an initial position, is kept displaced at a distance from the wedge member 8 which is part of the same pair, whereupon the unit 1 and its accompanying wedge member 8 can be lifted over the wedge member 5 without the wedge member 8 having to encounter the wedge member 7. The unit 1 and its support surfaces 15, 16 are pressed towards the support surface 14, whereupon the unit is lowered so that the wedge members 5, 6 in one of the pairs are connected with each other, i.e. so that their wedge surfaces 10, 11 will be in close contact with each other. If the attachment is such that the unit 1 is hanging vertically, then the unit is allowed to hang in such a way that the two wedge members 5, 6 are engaged with each other. In that connection, the support surface 16 in the other pair of wedge members may rest against the support surface 14 of the attachment surface 2. Thereafter, the movable wedge member in the other pair of wedge members 7, 8 is moved in the direction of the wedge member 8, until their wedge surfaces 12, 13 are in close contact with each other and are tightened against each other by means of a tightening device, which will be described in detail below. By means of the tightening, a safe frictional engagement is achieved through relatively extensive frictional forces and standard forces between the wedge surfaces 10, 11 and 12, 13, respectively, in each pair of wedge members 5, 6, 7, 8.

Figure 2:
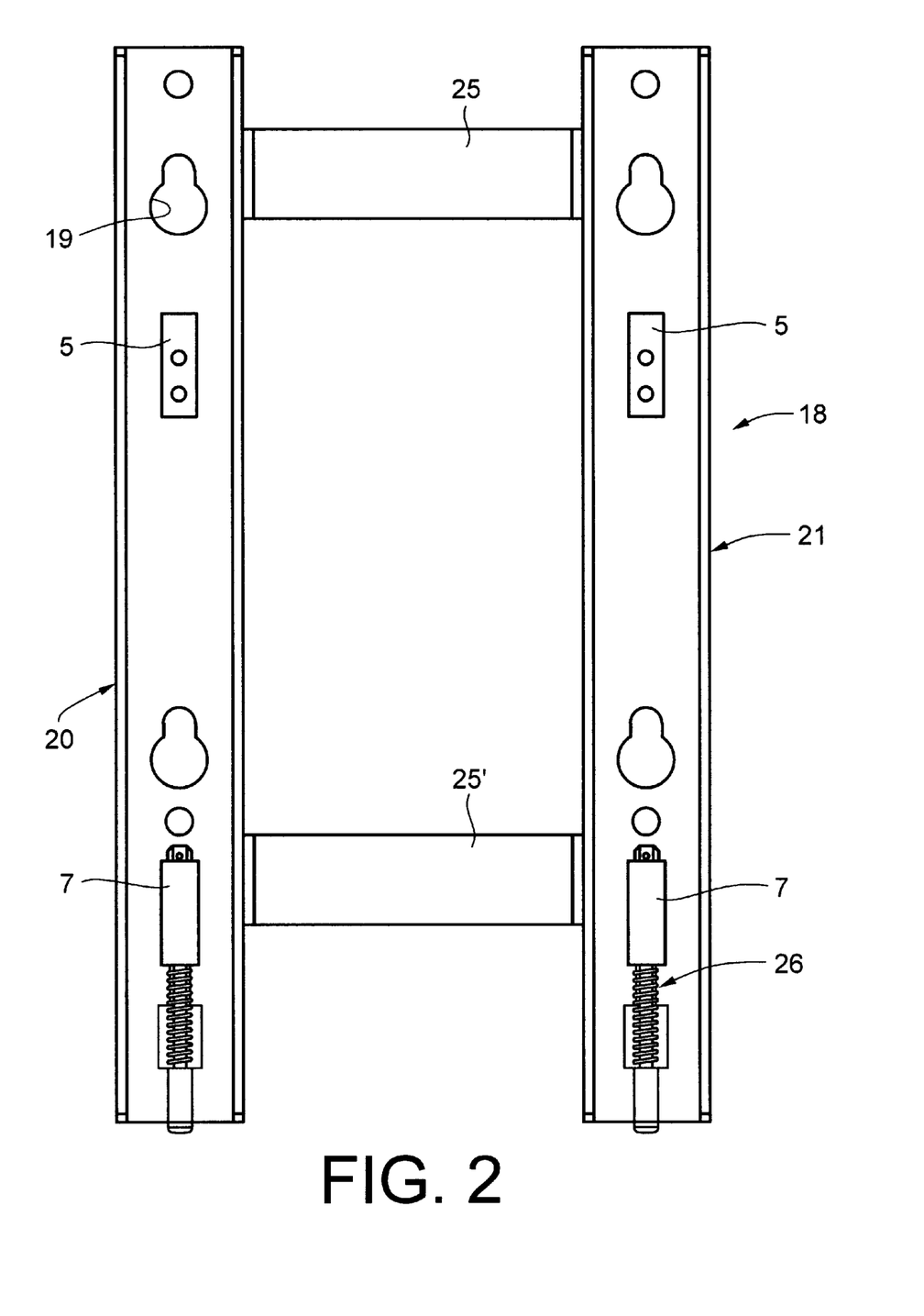
FIG. 2 is a front view of a base structure forming part of the attachment arrangement.
Figure 3:
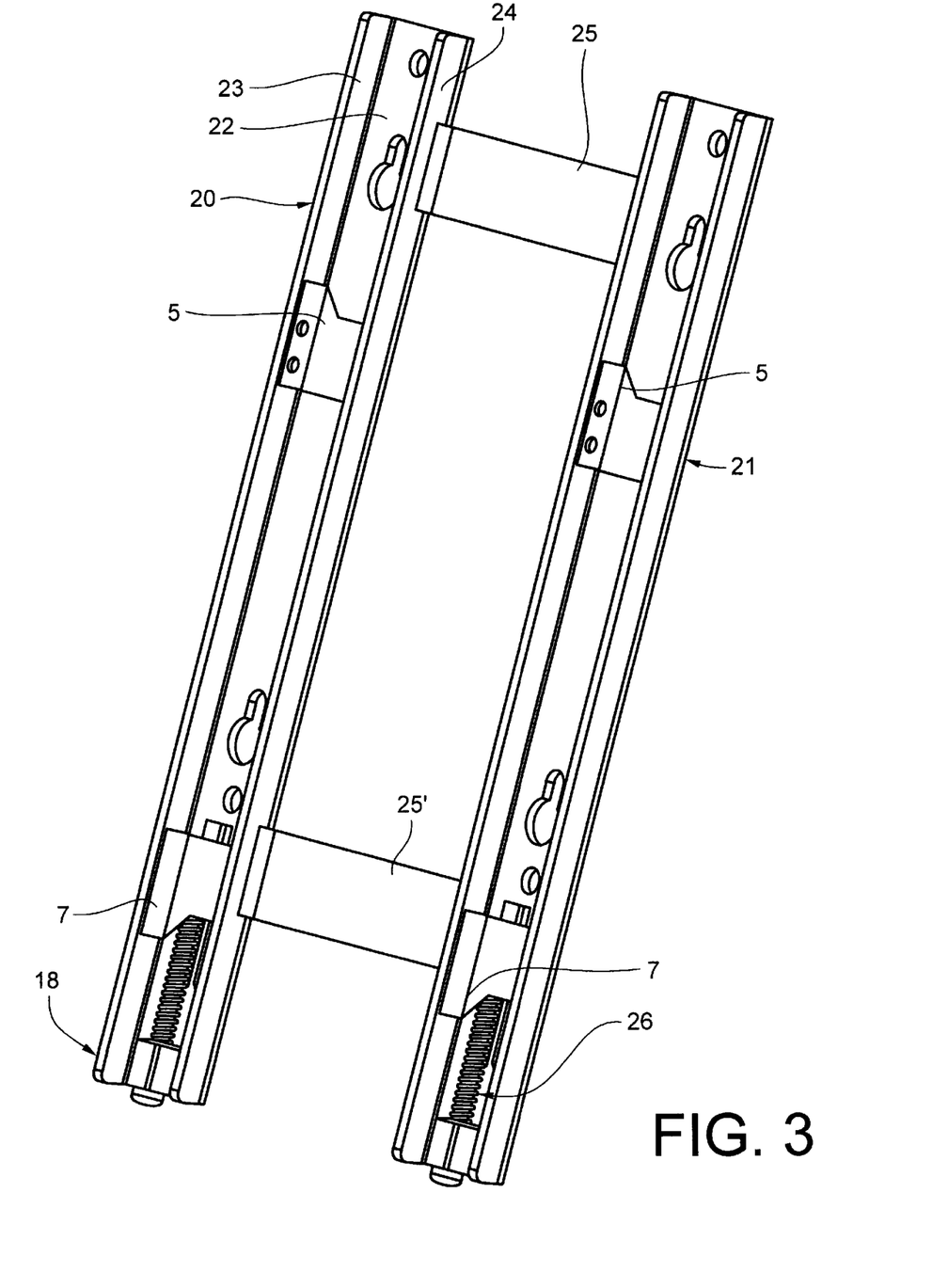
FIG. 3 is a perspective view of the base structure.

A concrete example of an embodiment will henceforth be described, in which FIGS. 2 and 3 primarily show a base structure in the form of an attachment support 18, which supports the wedge members 5, 6 which are part of the attachment surface 2. The attachment support 18 is intended to be fastened to the attachment surface 2 by means of attachment members (not shown). This is achieved by means of, for example, screws which are inserted through holes 19 in two profile rails 20, 21, which are included in the attachment support. As is shown in FIG. 3, the profile rails 20, 21 are designed as U-profiles having a base 22 and two upstanding flanges 23, 24. Furthermore, connection members 25, 25' are included in the attachment bracket 18, said connection members being in the form of cross bars and intended to connect the profile rails 20, 21 with each other and to maintain a fixed relative position of the wedge members 5, 7, of which there are four in the shown example.

According to the invention, a tightening device 26 is included in the attachment arrangement, said tightening device being included to tighten the movable wedge member 7 against the wedge members 8 in a way which will be described in detail below.

Figure 4:
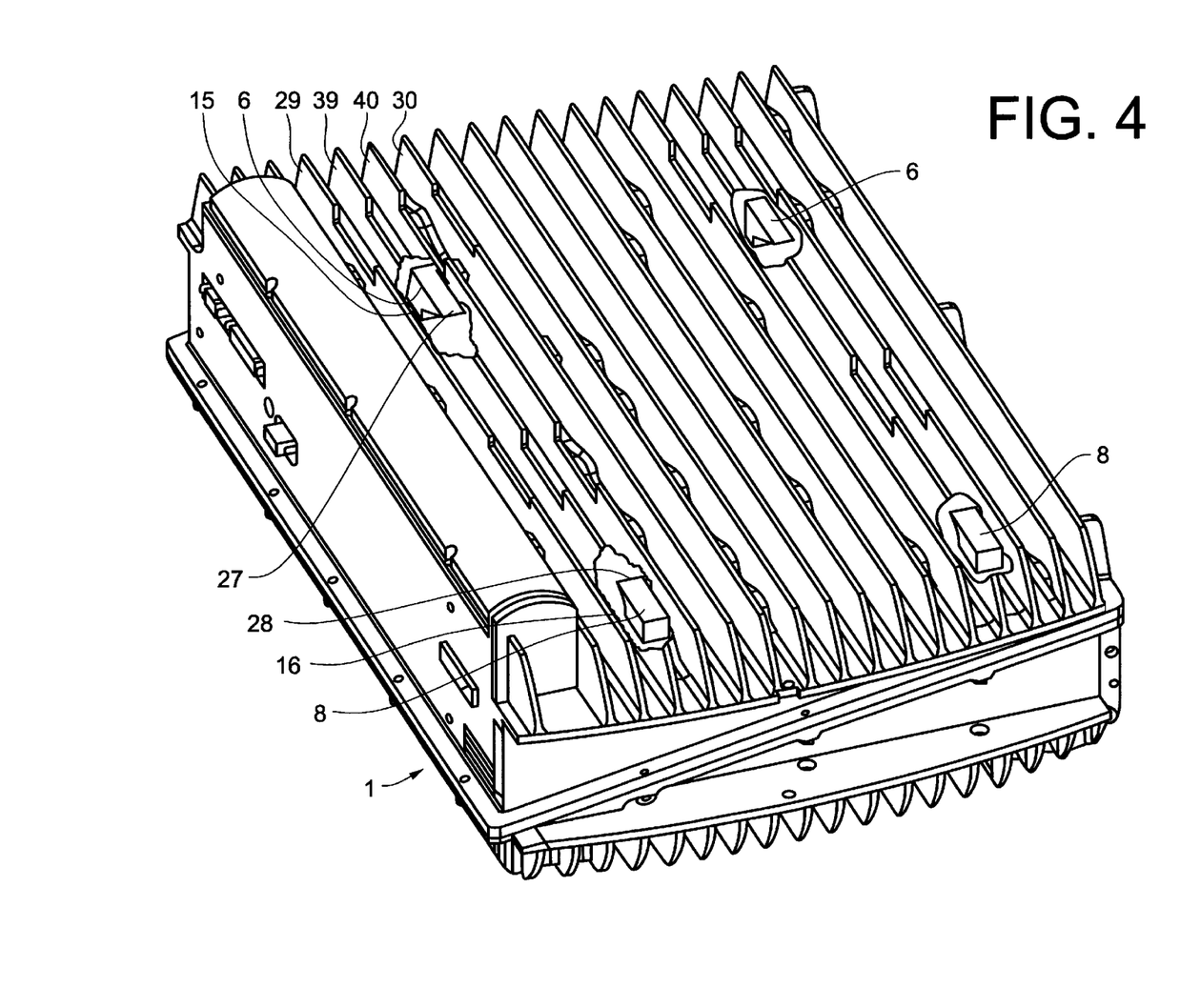
FIG. 4 is a perspective view of a unit provided with engagement members and forming part of the attachment arrangement according to the invention.

FIG. 4 shows an example of the construction of the unit 1, in which here only those details which are of interest as regards the understanding of the present invention will be described. In this example, the number and the location of the wedge members 6 and 8 are selected in order to correspond to the construction of the attachment support according to FIGS. 2 and 3, i.e. so that there are four wedge members being part of the unit. In the shown example, the position of the wedge members 6, 8 on the unit is completely fixed, said wedge members 6, 8 on the unit is completely fixed, said wedge members furthermore being directed in such a way that their points 27, 28 are directed towards each other. The support surfaces 15, 16, which are described above and which cooperate with the wedge members, are in the shown example formed of edge sections of flanges 29, 30 pointing backwards, which primarily are used as cooling flanges intended for cooling of electronics in the unit 2. The flanges are also used as members for lateral guiding, which will be described in detail below.

Figure 5:
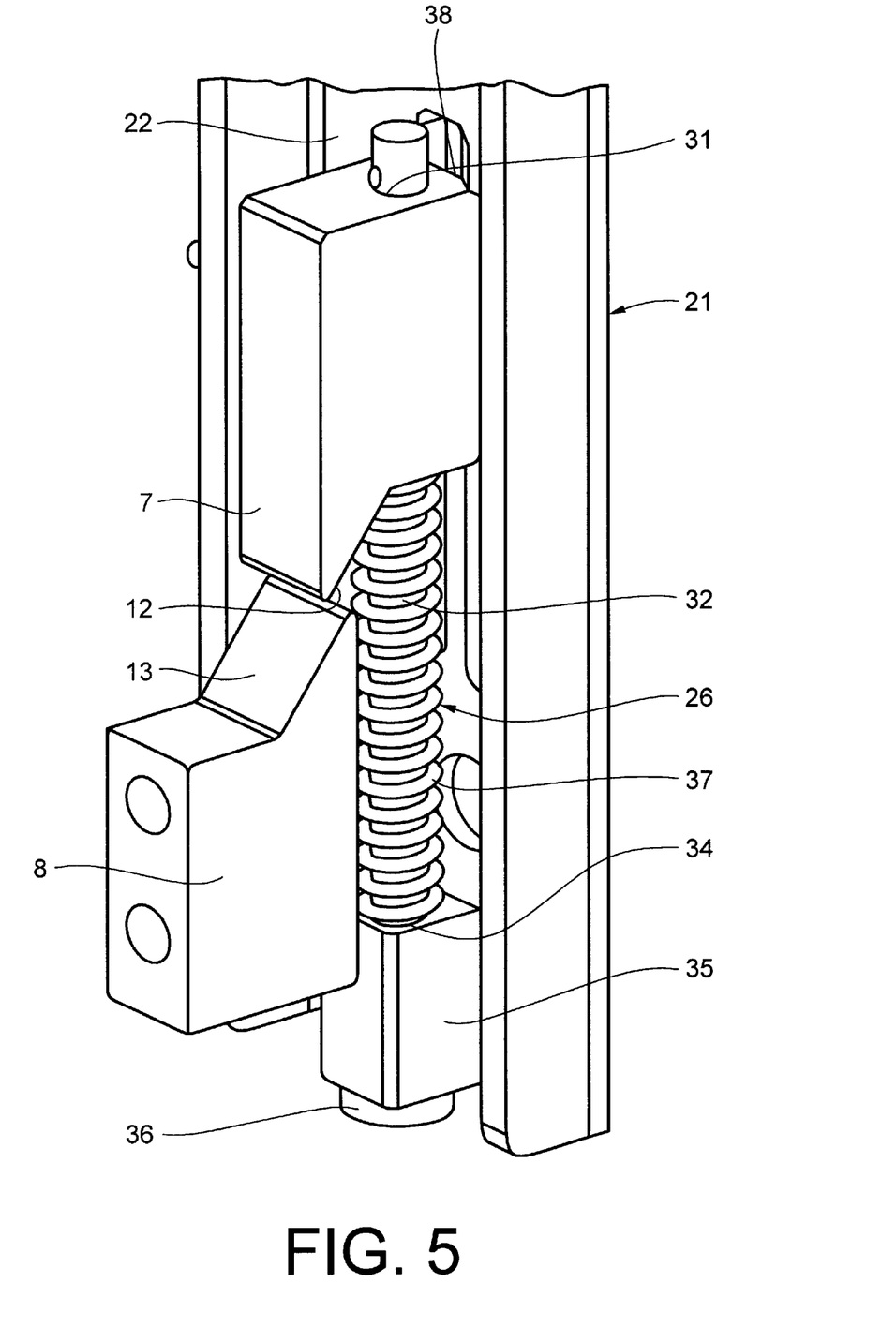
FIG. 5 is a perspective view of the attachment arrangement which shows one pair of the engagement members, one of the engagement members being movable.

In the shown example, which is best illustrated in FIG. 5 the tightening device 26 is constituted by a screw 32 which is screwed in a threaded, continuous drilling 31 in the wedge member 7, said screw extending through a drilling 34 in a fixed bracket 35. The screw is rotatable in the drilling 34 without axial displacement and is accessible below the bracket 35 by means of a tool, such as a screwdriver which rotates the screw by rotating a screw head which is accessible below the bracket. A pressure spring 37 is clamped between the wedge member 7 and the bracket 35, said pressure spring applying a force against the wedge member which strives to hold the wedge member in a position which is determined by the screw position in the threaded drilling 31. The movability of the wedge member 7 is achieved by the wedge member being fastened in the base 22 of the profile rail 21 through a guide 38, which extends in a portion of the longitudinal direction of the profile rail and cooperates with a stretcher (not shown) at the rear side of the wedge member 7, said stretcher for example being in the form of a T-profile with guide surfaces and conventionally fastening the wedge member 7 in the profile rail 21, while at the same time allowing for a movability in the longitudinal direction of the rail.

FIG. 5 also shows one of the wedge members 8 which are part of the removable unit 2, whereupon in mounted position the wedge surface 12 of the movable wedge member 7 is intended to be pressed against the wedge surface 13 of the wedge member 8.

Figure 6:
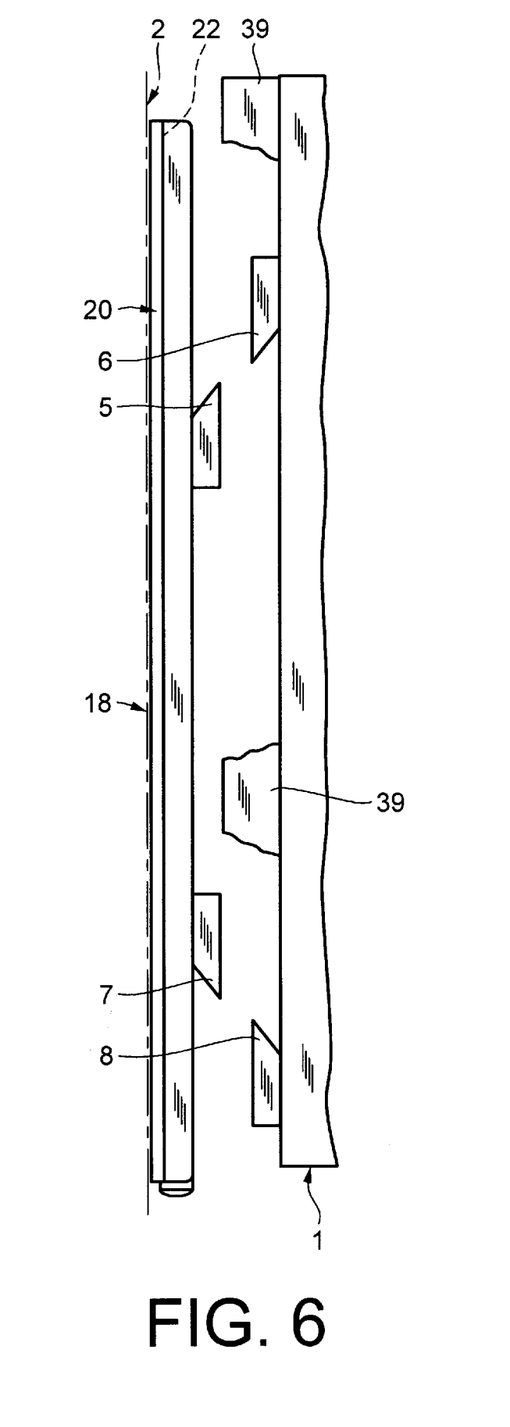
FIG. 6 is a side view of the attachment arrangement which schematically shows a unit which shall be attached to the base structure.

FIG. 6 illustrates the mounting position for the unit 1, said mounting position constituting the initial phase in a mounting situation in which the unit 2 shall be mounted to the attachment support 18, which is described in the example above. From this it is apparent that the movable wedge member 7 is displaced to such an extent that it does not constitute an obstacle for the unit to be hung on the attachment support 18. By means of a unit displacement which is essentially parallel, the unit may be attached to the attachment support in such a way that the upper wedge member 6 of the unit can be raised above the wedge member 5 being part of the same pair, while the lower wedge member 8 of the unit can be lowered below the wedge member 7 being part of the same pair.

Figure 7:
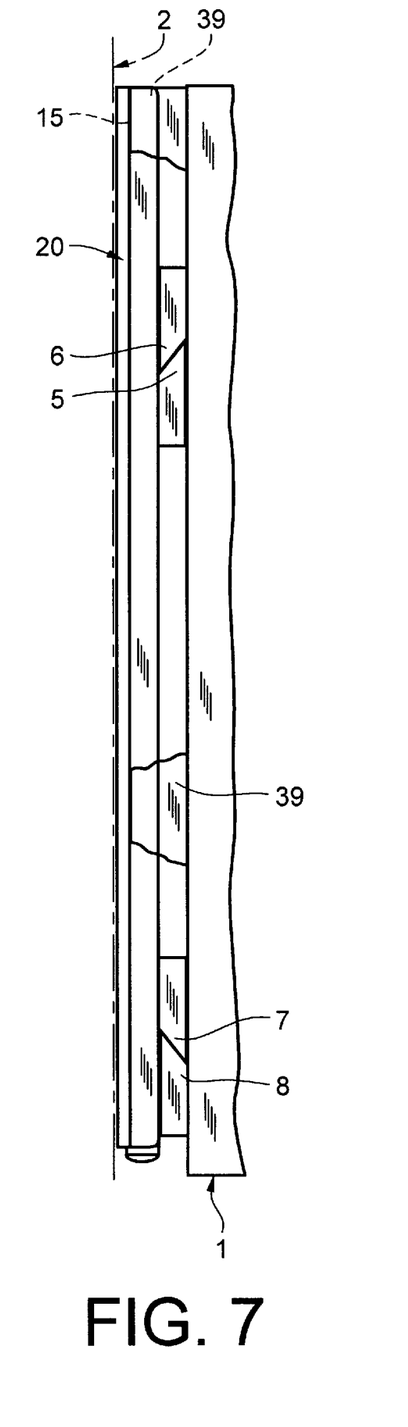
FIG. 7 is a corresponding side view which shows the unit in attachment position.

FIG. 7 shows an attachment position in which the upper wedge members 5, 6 in the upper pair have been connected to each other by means of a wedge effect. This connection is achieved with the assistance of the cooling flanges 29 of the unit 2, the support surface 15 of said cooling flanges being in close contact with the support surface 14 of the attachment surface 2, which in the shown example forms the base 22 of the profile rails 20, 21 (also, see FIG. 8). By means of the tightening device 26, the movable wedge member 7 has been pulled downwardly, and by means of a wedge effect, said movable wedge member has been tightened against the wedge member 8. Since the wedge members 6, 8 included in the unit 1 are fixedly mounted in an essentially rigid unit, the tensional force in the lower wedge pairs is transferred to a tensional force in the upper wedge pairs.

Inversely, disassembly is effected by the screw 32 being screwed in the opposite direction by means of the tool, whereupon the movable wedge member 7 is raised through the assistance of the spring 37 until the position according to FIG. 6 is achieved, said position in this connection being a disassembly position.

Figure 8:
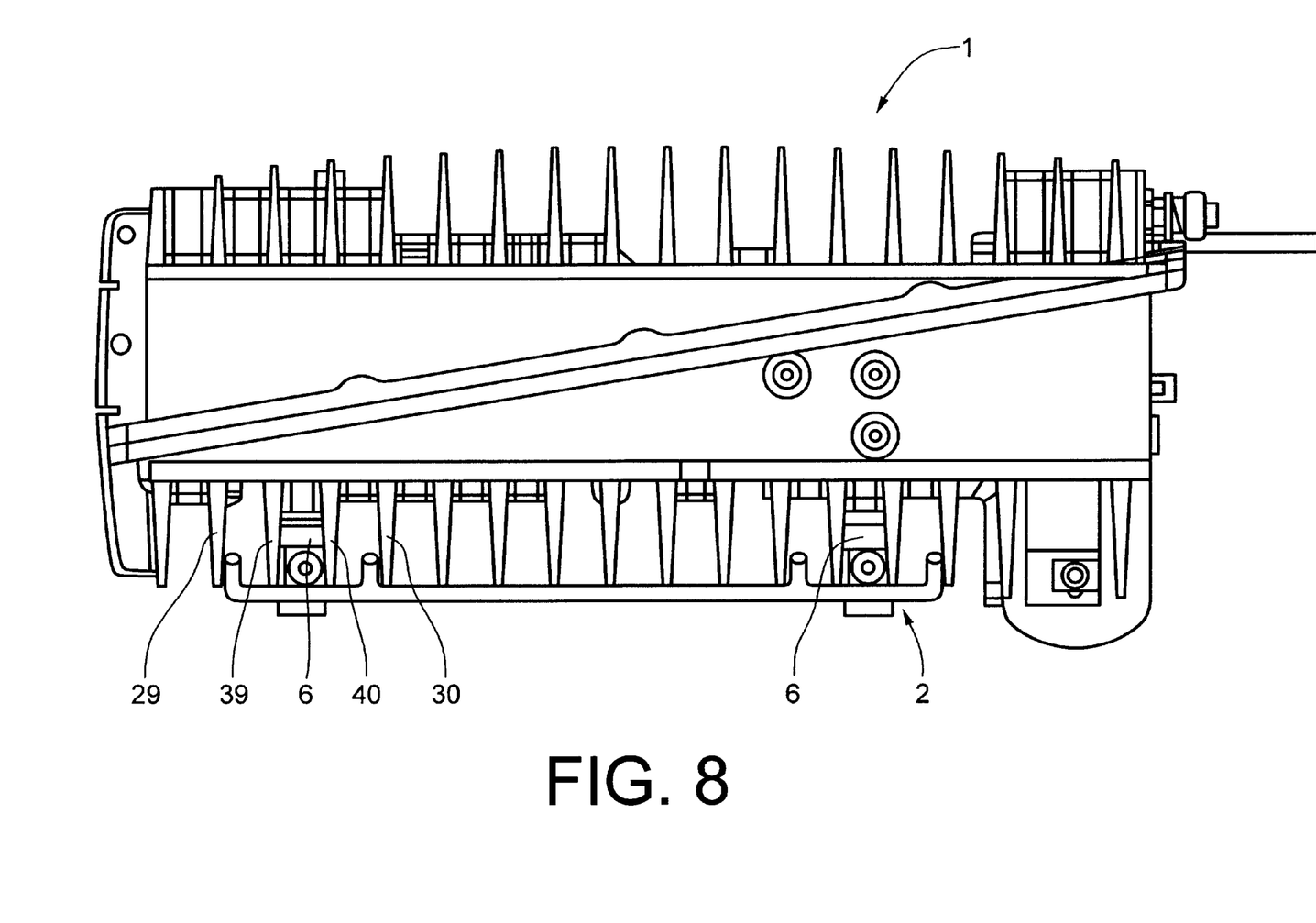
FIG. 8 is a top view of the unit, in which the unit is attached by means of the attachment arrangement to the base structure.

Moreover, FIG. 8 shows that members intended for lateral guiding are provided, which means that a limited adjustment of the unit 1 is obtained and that it is impossible for the wedge members 5–8, when mounted, to be laterally displaced from the engagement position. In the shown example, the cooling flanges 29, 30 are used for this purpose as well. For this reason, said cooling flanges cooperate with the flanges 23, 24 in the profile rails 20, 21 and protrude with suitable clearance on both sides of said flanges. As an alternative, or as a complement, the lateral guiding is secured, as is shown in FIG. 8, by means of the cooling flanges 39, 40 cooperating with the lateral surfaces of the wedge members.

To sum up, the unit is thus attached to an attachment surface through a number of key joints and by means of the attachment forces solely being absorbed through the active surfaces, i.e. the wedge surfaces and the support surfaces. Thus, the points of the wedge members must not "touch bottom" against any additional support surface.

An extremely stable attachment of units is provided by means of the attachment arrangement, said attachment being without and having a capacity to withdraw considerable mechanical strains. Assembly and disassembly of even heavy units will to a great extent be facilitated, which is due to the fact that during vertical mounting is allowed to hang in the upper wedge members in a highly secure way, while the lower wedge members are tightened in pairs.

The invention is not limited to the embodiments which are described above and shown in the drawings, but may be varied within the scope of the appended claims. As an alternative, the wedge members may be arranged in such a way that the support surfaces, which are described above and are part of the unit, are formed by surfaces on the wedge members. The number of pairs of wedge members may be two, three (in a triangular orientation) or more, depending upon the size and the form of the unit. The tightening device may be constructed in several different ways, for example as a buckle intended for a slalom-skiing boot.

What is claimed is:

1. Arrangement for releasable attachment of a unit to an attachment surface, the arrangement comprising:

a first pair of engagement members that engage each other;

a second pair of engagement members that engage each other, wherein one of the engagement members in each pair of engagement members is constructed for fastening to the attachment surface, and the other engagement member is constructed for attachment to the unit, at least one of the engagement members in each said pair is formed by a wedge member, and at least one movable engagement member of the pairs is attached in relation to a corresponding engagement member in the other pair, the movable engagement member being constructed to be displaced from the other engagement member in the same pair in mountable position and a dismountable position of the unit; and a tightening device for tightening the moveable engagement member to the other engagement member in an attachment position of the unit, so that at least one support surface of the unit is adapted to be in close contact with a support surface of the attachment surface, the tightening device including a screw for adjusting the moveable engagement member between the mounting and disassembly position and the attachment position by pivoting and for maintaining the movable engagement member in each of these positions.

2. The arrangement according to claim 1, wherein all of the engagement members are formed by wedge members.

3. The arrangement according to claim 2, wherein the arrangement is constructed in such a way that the unit is adapted to hangs substantially vertically, the pair of wedge members are formed by at least one upper pair of wedge members and one lower pair of wedge members, the wedge member that is included in the upper pair and that is constructed for attachment to the attachment surface is directed away from a corresponding wedge member in the lower pair, and the wedge member that is included in the upper pair and that is constructed for attachment to the unit is directed towards a corresponding wedge member in the lower pair.

4. The arrangement according to claim 3, wherein both wedge members in each pair of said wedge members have wedge surfaces that are in close contact with each other in pairs in the attachment position, with frictional engagement under one and the same angle in relation to the attachment surface.

5. The arrangement according to claim 4, wherein the wedge surfaces of the wedge members that are constructed for attachment to the attachment surface are substantially directed toward the attachment surface, and the wedge surfaces of the wedge members that are constructed for attachment to the unit are substantially directed towards the unit.

6. The arrangement according to claim 4, whereby the support surface on the unit is adapted to formed by a number of flanges which protrude from the unit.

7. The arrangement according to claim 6, wherein the wedge members that are constructed for attachment to the attachment surface are attached to a base structure in the form of an attachment support, the attachment support containing at least one profile rail having a base and protruding flanges, wherein the base forms the support surface being part of the attachment surface.

8. The arrangement according to claim 7, whereby the flanges on the unit are constructed to cooperate with laterally directed surfaces of the flanges on the profile rail or with the wedge member constructed for attachment to the attachment surface, for guiding the unit laterally.

9. The arrangement according to claim 7, wherein the screw is pivotally arranged in the attachment support, the screw being in threaded engagement with the movable wedge member.

10. The arrangement according to claim 9, wherein a pressure spring is arranged between a fixed part of the attachment support and the movable wedge member, the pressure spring being arranged to keep the movable wedge member in a displaced position in the mounting position and the disassembly position.

* * * * *